United States Patent [19]
Irani et al.

[11] Patent Number: 5,768,447
[45] Date of Patent: Jun. 16, 1998

[54] METHOD FOR INDEXING IMAGE INFORMATION USING A REFERENCE MODEL

[75] Inventors: Micahal Irani, Princeton Junction; Shmuel Peleg, Princeton; Padmanabhan Anandan, Lawrenceville, all of N.J.

[73] Assignee: David Sarnoff Research Center, Inc., Princeton, N.J.

[21] Appl. No.: 663,582

[22] Filed: Jun. 14, 1996

[51] Int. Cl.$^6$ ........................................... G06K 9/00
[52] U.S. Cl. ................................... 382/305; 395/327
[58] Field of Search ............................. 382/100, 103, 382/107, 305; 348/715, 716; 395/327, 328, 968

[56] References Cited

U.S. PATENT DOCUMENTS

| | | | |
|---|---|---|---|
| 4,672,683 | 6/1987 | Matsueda | 382/57 |
| 5,388,197 | 2/1995 | Rayner | 395/154 |
| 5,572,726 | 11/1996 | Hasuo | 395/616 |
| 5,586,197 | 12/1996 | Tsujimura et al. | 382/162 |

OTHER PUBLICATIONS

Michal Irani, P. Anandan, Steve Hsu, "Mosaic Based Representations of Video Sequences and Their Applications", Fifth International Conference on Computer Vision, Jun. 20-23, 1995, IEEE Computer Society Press, pp. 605-611.

Primary Examiner—Andrew Johns
Attorney, Agent, or Firm—William J. Burke

[57] ABSTRACT

A method for indexing video sequences relative to a reference model. A system implementing the method includes an (optional) image pre-processor that produces the reference model or is provided the reference model. The pre-processor is then provided input image data such as a video sequence containing a series of frames of a particular scene. The pre-processor performs a transformation to align the images within the video sequence with the reference model. The pre-processor then stores the transformation, the reference model and the image data within a mass storage device such as a hard disk drive. Subsequently, the system provides access to the information stored within the mass storage device through a user interface. The user may recall and position on a computer screen the reference model, select a particular point within the reference model, and request that the system produce all of the image data that contains that particular point within the reference model.

14 Claims, 5 Drawing Sheets

METHOD FOR INDEXING IMAGE INFORMATION USING A REFERENCE MODEL

The invention was made with Government support under Contract No. F33657-95-C-5056. The Government has certain rights in this invention.

The invention relates to image processing systems, and more particularly, to a method for indexing image information within a storage medium.

BACKGROUND OF THE DISCLOSURE

Generally, image information such as video sequences are stored within mass storage devices such as disk drives for subsequent recall and utilization by users of the video sequences. To index such video sequences within the mass storage device, a header is generally used to identify the content of the video sequence associated with a particular header. Consequently, a user conducts a word search through the header information to find a particular video sequence that contains information of interest. Thereafter, a frame-by-frame search is conducted on the recalled video sequence to allow the user to find particular information of interest within the video sequence. Consequently, such a search process and indexing system is time consuming and costly.

Therefore, there is a need in the art for a method of indexing image information such as the information contained in video sequences that facilitates efficient recall and manipulation of the image information.

SUMMARY OF THE INVENTION

The disadvantages heretofore associated with the prior art are overcome by the present invention of a method for indexing video sequences relative to a reference model. In particular, the system in which the method is embodied relates each frame of a given video sequence to a reference model. The reference model can be a two-dimensional framework, e.g. a map corresponding to a scene depicted in the video sequence, an image of the entire scene, a mosaic assembled by aligning the frames of a sequence of video images and combining those images into a panoramic view of the scene, a schematic diagram of the scene, a collection of some or all of the above. Furthermore, the reference model can be a three-dimensional model such as a computer aided design model of a particular scene.

The video sequence to be indexed has to be pre-processed such that every frame includes information about the coordinate transformation between itself and the reference model. Such transformation between itself and the locations in the reference model which are visible in the video frame or the group of frames. This pre-processing, also known as "alignment", can be accomplished as part of the present system, or can be performed by other means.

Once the information is stored, the system provides access to the information stored within the mass storage device through a user interface. The user may recall and position on a computer screen the reference model, select a particular point within the reference model, and request that the system produce all of the video frames that contain that particular point within the reference model. Alternatively, the user may select a particular location point or region within the one video frame and the system provides the portion of the reference model that includes that position within the video sequence. Subsequently, the user can request all other video frames that cover that particular point or region within the reference model. Alternatively, a user can select a region or an object to be viewed by the coordinates of its location.

In addition, the system provides a method for directly accessing portions of a video sequence containing a particular dynamic event of interest by distinguishing the dynamic event from stationary image information in the form of a "synopsis reference." A synopsis reference represents a subsequence of image information containing a dynamic event by having individual snapshots of the event added to the reference model. An example of a synopsis reference in a video sequence is a moving object within the video sequence that appears as a trajectory of the object upon the reference model.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, were possible, to designate identical elements that are common to the figures.

DETAILED DESCRIPTION

Figure 1:
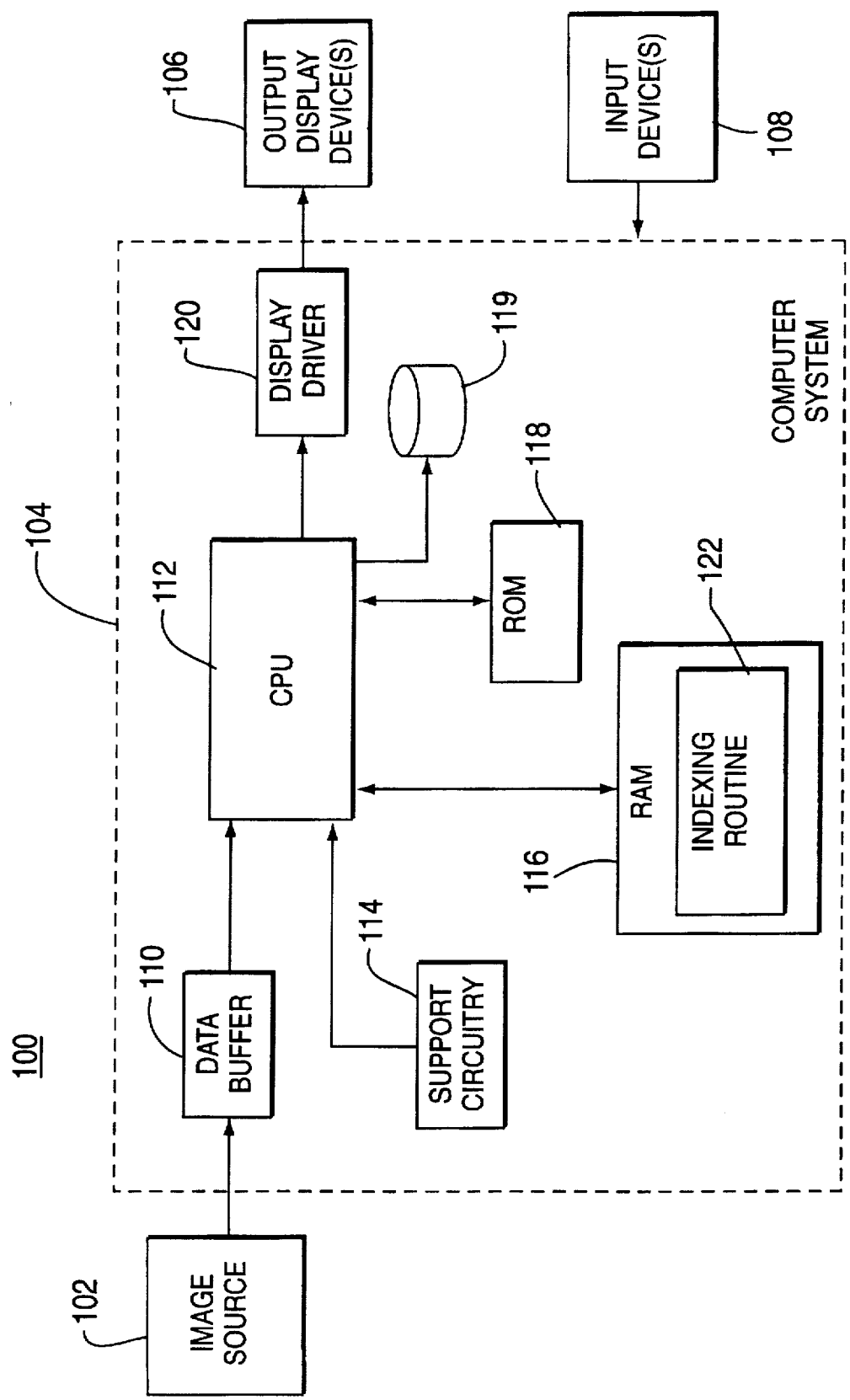
FIG. 1 shows a general purpose computer system containing a software implementation of the present invention.

FIG. 1 depicts a block diagram of a system 100 for indexing image information contained in, for example, video sequences using a reference model. This system contains an image source 102, a computer system 104, one or more output devices 106, and one or more input devices 108. The image source 102 can be a video camera, an infrared camera or some other sensor that generates a series of two-dimensional images representing a scene. Alternatively, the image source is a storage device such as a video tape recorder, disk drive, or other means of storing sequential images representing a scene. This system generally processes digital images; therefore, if the image source produces analog images, a digitizer (not shown) is used between the image source and the computer system.

The general purpose computer 104 facilitates generation of the reference model, indexing of a video sequence into the reference model, and recall image information at any location within the reference model or video sequence. Specifically, the computer system contains a data buffer 110, a central processing unit (CPU) 112, support circuitry 114, random access memory (RAM) 116, read only memory (ROM) 118, mass storage device 119, and a display drive 120. Additionally, a user interacts with the computer system through one or more input devices 108 such as a keyboard, mouse, track ball, touch pad, and the like. Also, the computer system displays the images and various graphical interface displays or screens on the output display device 106 such as a computer monitor. Alternatively, the computer system may also interact with other output display devices such as a printer to provide a hard copy of any display that appears on the computer monitor.

The data buffer 110 provides data rate equalization (frame buffering) between the image source and the CPU. Typically, this buffer is a first-in, first-out (FIFO) buffer. Such buffers are typically used to provide a constant data rate to the CPU while providing flexibility in data rates that can be generated by an image source.

The CPU 112 is typically a general purpose processor. Since the software implementation of the present invention is not required to execute on any specific processor, the routines of the present invention can be executed upon any type of processor or combination of processors in a parallel processing computer environment.

The CPU 112 operates in conjunction with various other circuits such as RAM 116, ROM 118 and support circuitry 114 such as co-processors, clock circuits, cache, power supplies and other well-known circuits. The operation and inter-relationship of these various computer components is well known in the art and does not require further explanation. The display driver 120 may be a video card printer driver or other common driver, software or hardware as required by output devices 106. In addition, the mass storage device may be a disk drive or some other randomly accessible mass storage device.

The RAM 116 stores the software implementation of the present invention. Typically, the routines of the invention are stored in the mass storage device 119 and recalled for temporary storage in RAM 116 when executed by the CPU 112. The invention is implemented as the indexing routine 122.

Figure 2:
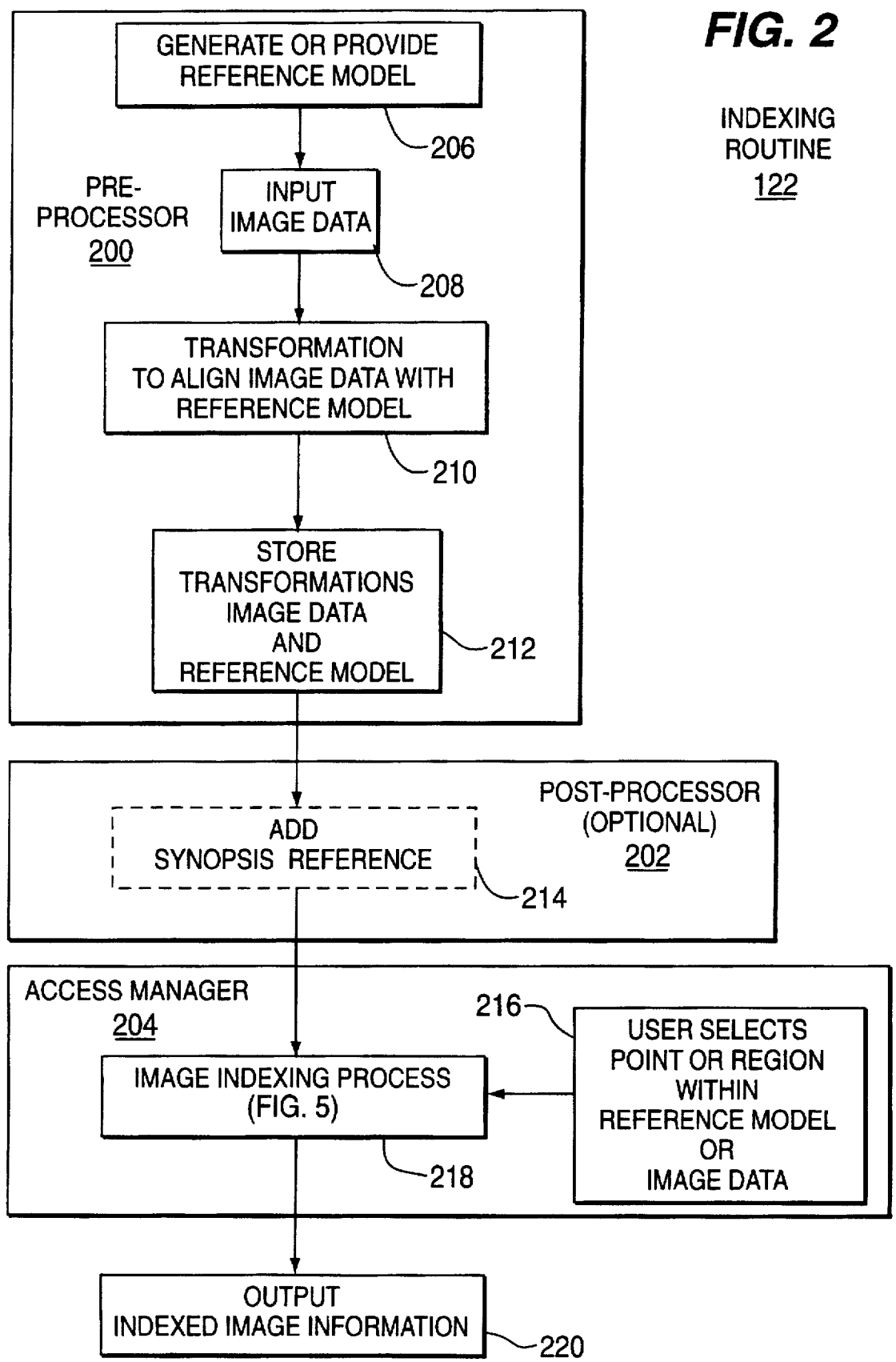
FIG. 2 depicts a flow diagram of the software implementation of the present invention.

FIG. 2 depicts the indexing routine 122. The main components of the routine 122 are a pre-processor 200, a post-processor 202, and an access manager 204. The post-processor 202 provides an optional feature of the invention. The optional pre-processor begins by generating or recalling from memory the reference model, also referred to as a reference map. The model may be recalled from memory as a complete image of a scene such as an aerial view or a satellite view of a particular scene. Alternatively, the reference model could also be a computer generated three-dimensional schematic of a building or other geometric configuration. Furthermore, the reference model may be generated from a sequence of video images that are aligned into a panoramic mosaic depicting a particular scene. Such a panoramic mosaic is described in U.S. patent application Ser. No. 08/339,491, filed Nov. 14, 1994, and incorporated herein by reference. Also, typical geographic maps or architect design and sketches or any other form of map may be used as the reference model.

At step 208, image data is provided to the pre-processor as a sequence of video frames. The routine performs a transformation, at step 210, to align each frame with image information within the reference model. Such transformations that can align a two-dimensional reference model with a two-dimensional image frame include two-dimensional affine transformations or any other two-dimensional parametric transformation. In other cases, while the two-dimensional transformation may be adequate to align some flat surfaces in the scene, e.g. a ground surface, a wall and the like, additional information, like relative camera position, or full or partial optical flow, may be needed for every image point to improve the alignment of the frames to the reference model.

Figure 3:
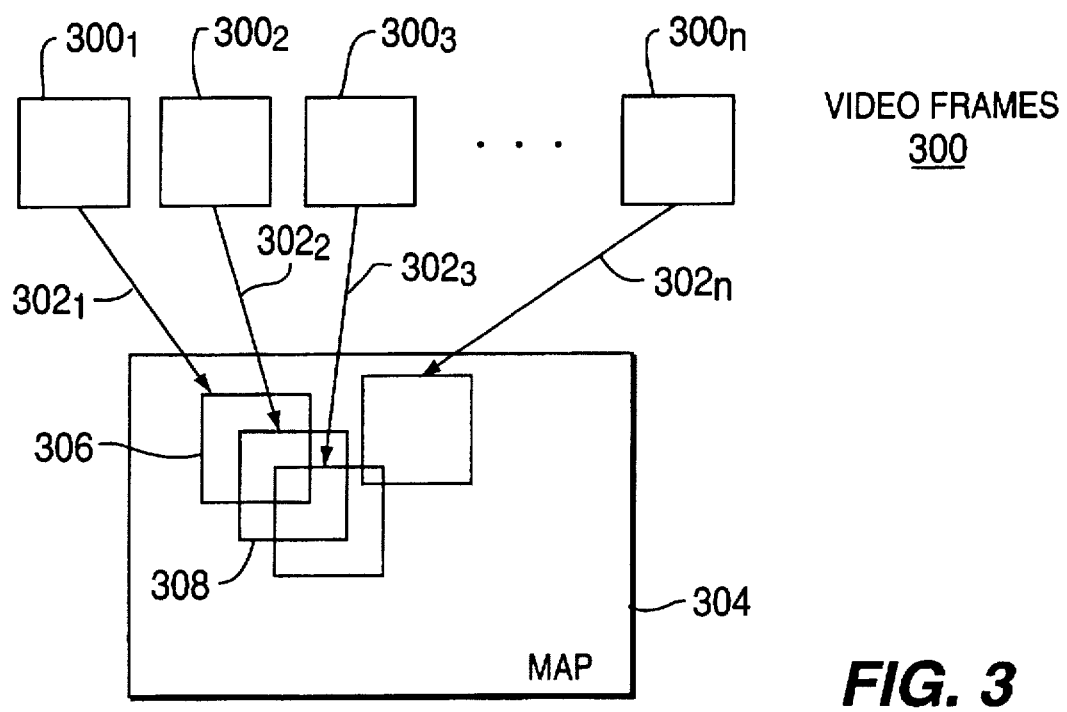
FIG. 3 depicts a schematic illustration of an alignment process for mapping a video sequence onto a reference model.

FIG. 3 illustrates a typical example of how frames can be related to the reference model. The series 300 of video frames $300_1, 300_2, 300_3, \ldots 300_n$ are mapped by transformations $302_1, 302_2, 302_3 \ldots 302_n$ into the reference model 304. The field of view of frame $300_1$ is the region 306 within the map of 304. The field of view of frame $300_2$ is the region 308 that is in the map, and so on.

Returning to FIG. 2, the video frames within the video sequence, the transformations (or transformation parameters) which align the frames with the reference model and the reference model itself are stored within the mass storage device at step 212.

Figure 4:
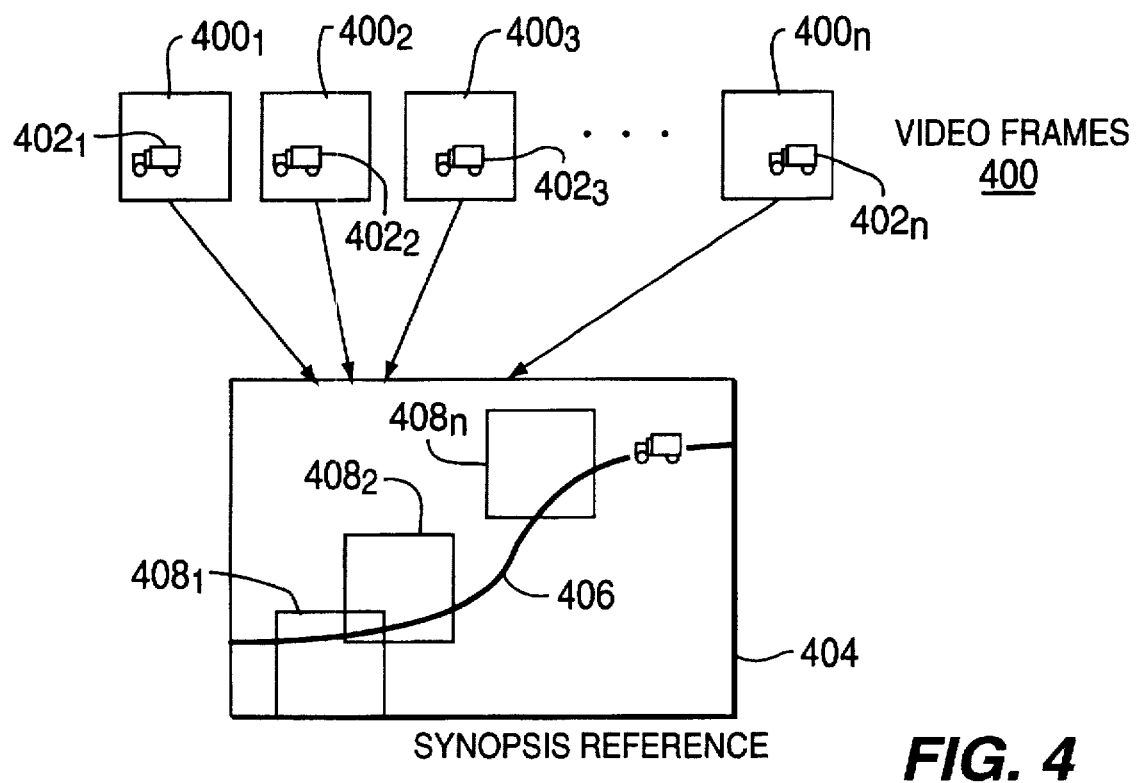
FIG. 4 depicts a schematic illustration of utilization of a synopsis reference.

At step 214, within post processor 202, a "synopsis reference" can be optionally added to the reference model such that moving objects within the video sequences appear as trajectories on the reference model. The synopsis reference captures temporal events as both spatial structure and temporal events within the reference model. This synopsis reference represents a video sequence containing a dynamic event by having the individual snapshots of the event added to the reference model. An example is depicted in FIG. 4 where the video frames $400_1, 400_2$ and $400_3 \ldots 400_n$ include the moving object $402_1, 402_2$ and $402_3 \ldots 402_n$, respectively. Although the object appears in a different location in each frame, it is the same object. By aligning the video frames with a reference model, the routine produces a synopsis reference containing all the image information regarding the moving object as captured in the field of view 408 of each video frame. The synopsis reference 404 includes a trajectory 406, depicting a graphical projection onto the reference map of the trajectory of the object. Each point on the marked trajectory map may include temporal information, i.e., the time when the moving object was at that location, and a reference to a sub-image of the original frame showing the object as it was seen at that location. A method for generating a synopsis reference is disclosed in Irani, et al., "Mosaic Based Representations of Video Sequences and Their Applications", Fifth International Conference on Computer Vision, pp. 605–611, Jun. 20–23, 1995. Again, the preparation of the synopsis reference is assumed to be formed as a post-processing function, i.e., after the reference model and image data are aligned, but before access to the indexable database of image information begins.

Figure 5:
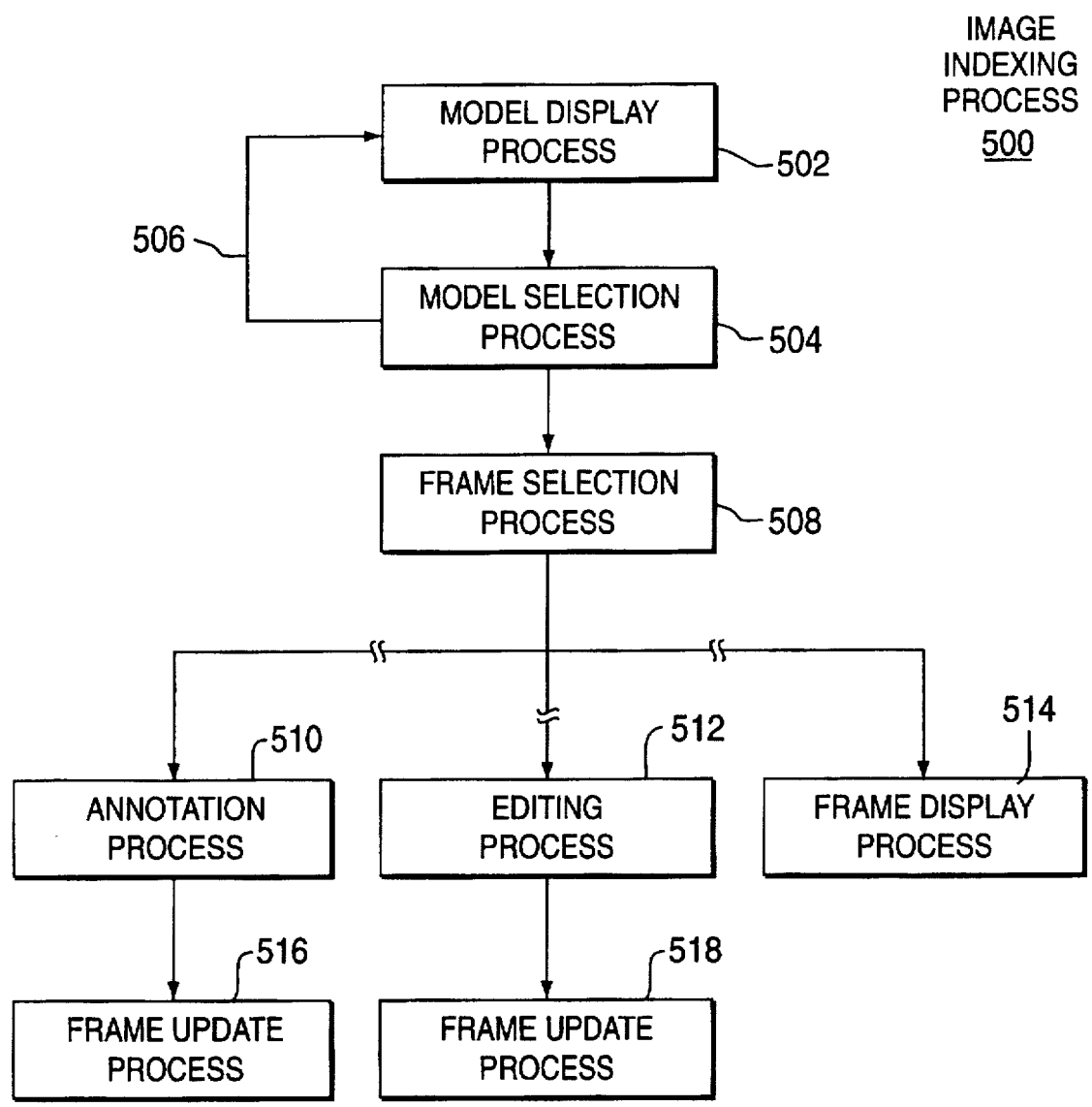
FIG. 5 depicts a flow diagram of an image indexing process.

The access manager 204 of FIG. 2 provides, at step 216, a user interface allowing the user to select certain image data of interest. Additionally, the access manager provides an image indexing process 218 and an output step 220 for producing the indexed frames and/or other image data for the user. Specifically, a user, through the interface, may select a particular point or region within the reference model or may select a point or region within the image data, i.e., a particular frame of the input video sequence. This information is then used to index either the reference model or the image data to recall all frames of image data that contain that particular point or region. Alternatively, if the user has selected a point or region within a frame of image data, the output is a portion of the reference model that contains that point or region. The user may then elect to further output indexed frames containing that point or region. FIG. 5 depicts the process by which the access manager indexes image data in detail.

FIG. 5 is a detailed flow diagram of a process 500 for indexing image data within the system of the present invention. The reference model is generally displayed at step 502. Initially, a default viewing region is portrayed to the user on the computer display. At step 504, the viewing region may be manipulated such that a different location within the model may be viewed. If the model is a three-dimensional model, a viewing position may also be selected. This display manipulation process is iterated along path 506 until the user has selected a region of interest within the model.

At step 508, the user selects a particular point or location within the reference model. This may be a region or a particular pixel point or a particular object within the reference model. For example, if the reference model is an aerial view of a map of the United States, the user may select first a particular state, then a particular county, then a particular town, then a particular street area, and finally, a particular street address by using a mouse pointer and zooming in to various regions within the reference model. The system will then recall all frames of video that contain that particular location within the reference model. Alternative to the selection of points or regions in the reference model, the user may select a particular point or a region in an image, and the system will provide the portion of the reference model that corresponds to the selected image point or region. This can be further used to recall all other video frames that contain this point or region. Alternatively, a user can select a region or an object to be viewed by the coordinates of its location. Such coordinates can be supplied from a regular or a computerized map, by a GPS unit, or by any other means.

Through the interface display, the user may then select whether to annotate those frames (step 510), edit those frames (step 512), or merely display those frames on the display screen (step 514). Such selection is generally a menu-driven selection process. At step 510, the user may add annotations to the frames portrayed on the screen. At step 516, the annotations are then saved with reference to the model. Alternatively, at step 512, the user may edit the frames that have appeared on the screen. The changes are then stored at step 518 with reference to the model. At step 514, the frames are merely displayed on the screen, and no editing or annotation is performed.

Figure 6:
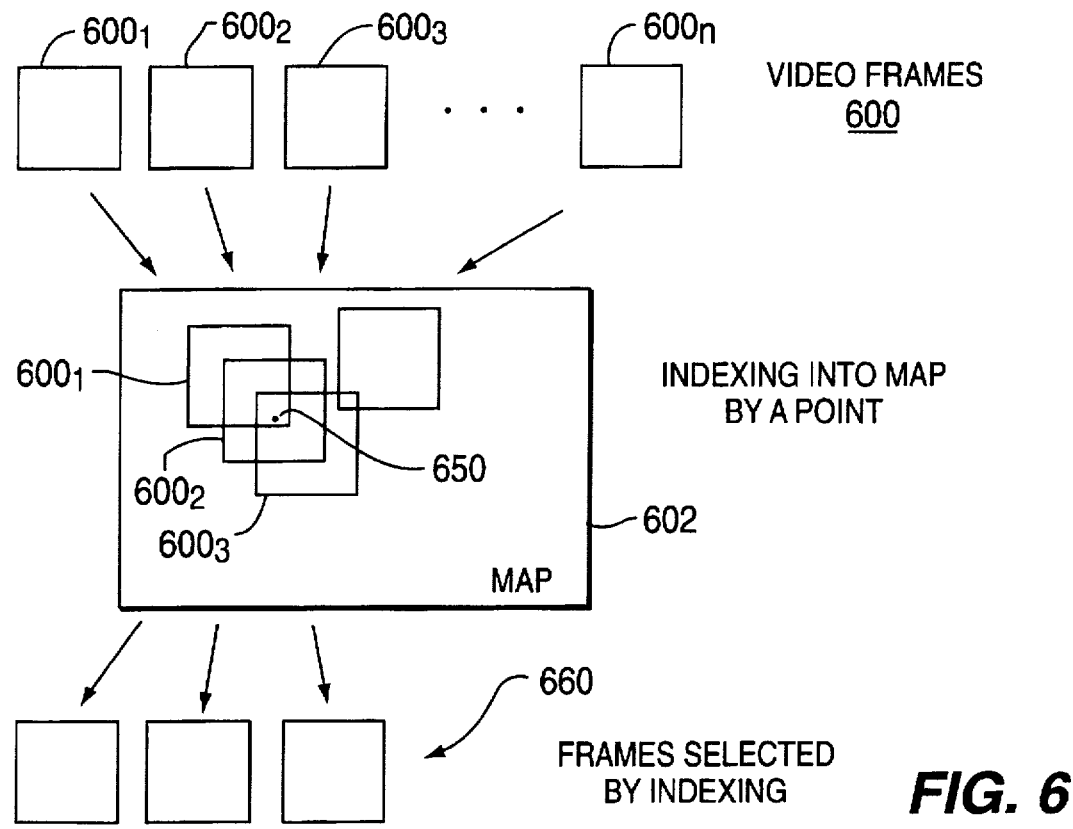
FIG. 6 depicts a schematic illustration of the indexing process.

FIG. 6 depicts a schematic illustration of the selection process 508, the relationship between the video frames 600 and the reference model 602 are shown. Thereafter, a particular location 650 within the reference model is selected by the user. In the example shown, that particular point within the reference model corresponds to three video frames, those being frames $600_1$, $600_2$ and $600_3$. As such, the system of the present invention will display those three frames showing the point of interest within each of the frames as frames 660.

In addition to manual selection of the points of interest, this system can also operate with any known automatic selection method. For example, the system can operate with known methods for searching for objects in images based on the image derived features, texture, color and other appearance-related properties, geometric shapes or other derived iconic or symbolic attributes and ancillary data. It is assumed that these search techniques will identify the pixel locations of the object of interest in a single video frame or the reference model. The point thus selected will be used to display the video subsequences where the selected point is visible.

As for accessing dynamic events, since the synopsis reference provides a snapshot view of an entire dynamic event, it can be used for indexing based on temporal events.

For example, when the motion of an object is represented as a trajectory over the reference model, the temporal event has been translated into a spatial event marking a segment on the trajectory. It is thus equivalent to marking a time interval which enables the display of all frames in that time interval. Thus, those frames will be recalled and displayed to the user showing the event of interest as a video sequence or video clip.

Figure 7:
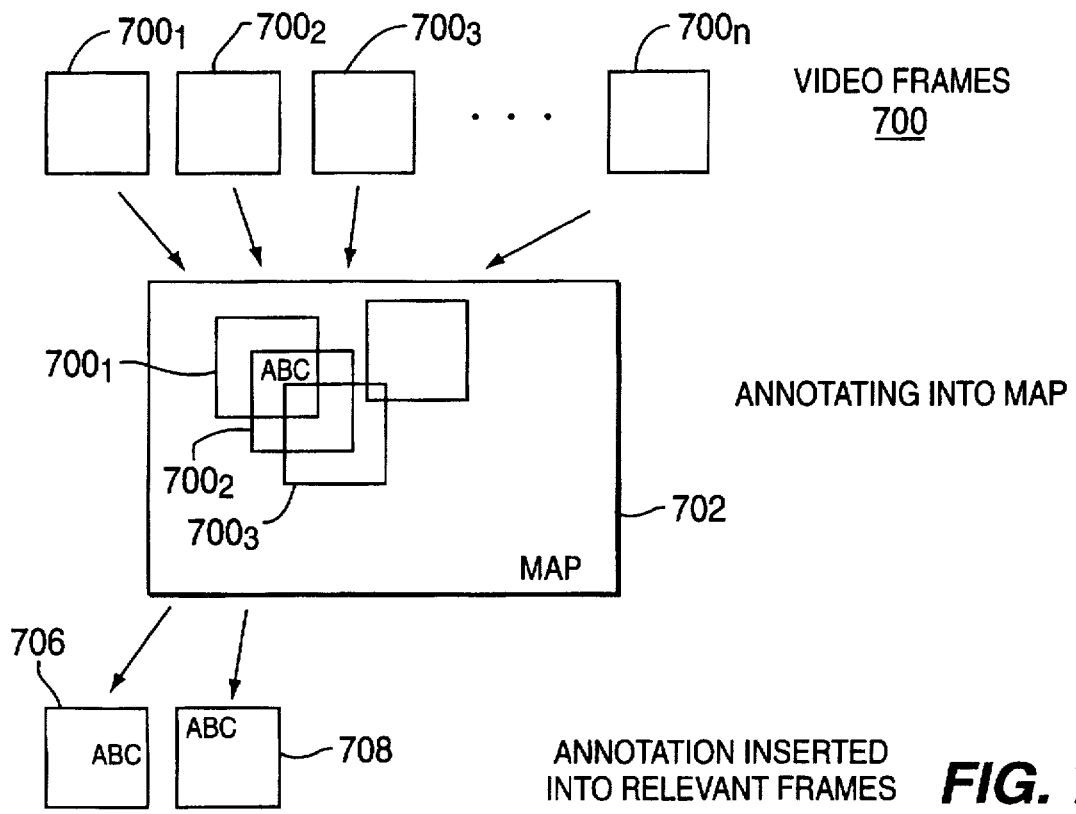
FIG. 7 depicts a schematic illustration of an image information editing process.

Editing or annotating the reference model, e.g., inserting an object such as adding a house in an aerial image, or a textual label, can be done directly in the reference model, or by editing or annotating a single frame. When editing or annotating a frame the system translates this into changes in the reference model. During display of frames where the annotated or edited location is visible, this change or annotation can be aligned and added to the displayed frames. FIG. 7 depicts an illustrative schematic representation of the annotation process. The editing is accomplished by taking into account the appropriate geometrical transformations between the video frames and the reference model 702. Insertion of an object through the reference model is much less tedious for an operator than the insertion of the object in each individual frame. The object 704 may be inserted within the reference model itself, or it may be inserted into one of the video frames 700 that is transformed into the reference model 702. As such, after the relevant frames have been selected, which correspond to the location of the inserted object, the editing process allows the user to edit the reference map or any of the video frames. Using the transformations between the frames and the reference model, this object can be, in turn, inserted into each of the selected frames 706, 708 that contain that region where the object is to be inserted. Object insertion is done during playback, and the images themselves are unchanged. This will allow the display of the original, unannotated images, if desired. As such, in the case where the object is inserted into one of the frames, it is inserted into the other frames using the transformation between the edited frame and the reference model in and the transformations between the other frames and the reference model.

When the alignment of the reference model to a geographical map is given, the geographical coordinates of each pixel in each frame of the input video sequence can be obtained from the transformations that relate to the individual video frames to the reference model. This involves a combination of transformation from the image to the reference model and from the reference model to the map.

Although various embodiments which incorporate the teachings of the present invention have been shown and described in detail herein, those skilled in the art will readily devise many other varied embodiments that skill incorporate these teachings.

What is claimed is:

1. A method for indexing image information, where said image information is a plurality of image frames aligned to a reference model using transformation parameters that define the alignment, said method comprising the steps of:

selecting a location within said reference model;

determining particular image frames within said plurality of image frames that contain the selected location using said transformation parameters; and outputting said particular image frames containing the selected location.

2. The method of claim 1 further comprising the steps of:

providing said reference model;

providing said plurality of image frames;

aligning each image frame in said plurality of image frames with said reference model using a transformation, where said transformation results in a set of transformation parameters for each image frame in said plurality of image frames;

storing said reference model, plurality of image frames and transformation parameters.

3. The method of claim 1 further comprising the steps of:

annotating at least one of said particular image frames with annotations; and updating said reference model and said particular image frames with said annotations.

4. The method of claim 1 further comprising the steps of:

editing at least one of said particular image frames with alterations; and updating said reference model and said particular image frames with said alterations.

5. The method of claim 1 further comprising the steps of producing, from said plurality of image frames, a synopsis reference for said reference model.

6. A method for indexing image information, where said image information is a plurality of image frames aligned to a reference model using transformation parameters that define the alignment, said method comprising the steps of:

selecting a location within one frame of said plurality of image frames;

determining a region of said reference model that contains said selected location using transformation parameters that align said one frame to the reference frame;

determining particular image frames within said plurality of image frames that contain the selected location using said transformation parameters; and outputting said particular image frames containing the selected location.

7. The method of claim 6 further comprising the steps of:

providing said reference model;

providing said plurality of image frames;

aligning each image frame in said plurality of image frames with said reference model using a transformation, where said transformation results in a set of transformation parameters for each image frame in said plurality of image frames;

storing said reference model, plurality of image frames and transformation parameters.

8. The method of claim 6 further comprising the steps of:

annotating at least one of said particular image frames with annotations; and updating said reference model and said particular image frames with said annotations.

9. The method of claim 6 further comprising the steps of:

editing at least one of said particular image frames with alterations; and updating said reference model and said particular image frames with said alterations.

10. The method of claim 6 further comprising the steps of producing, from said plurality of image frames, a synopsis reference for said reference model.

11. A method for indexing image information comprising the steps of:

providing a reference model;

providing a plurality of image frames;

aligning each image frame in said plurality of image frames with said reference model using a transformation, where said transformation results in a set of transformation parameters for each image frame in said plurality of image frames;

storing said reference model, plurality of image frames and transformation parameters;

selecting a location within said reference model or one of said image frames;

determining particular image frames within said plurality of image frames that contain the selected location using said transformation parameters; and outputting said particular image frames containing the selected location.

12. The method of claim 11 further comprising the steps of:

annotating at least one of said particular image frames with annotations; and updating said reference model and said particular image frames with said annotations.

13. The method of claim 11 further comprising the steps of:

editing at least one of said particular image frames with alterations; and updating said reference model and said particular image frames with said alterations.

14. The method of claim 11 further comprising the steps of producing, from said plurality of image frames, a synopsis reference for said reference model.

* * * * *